United States Patent [19]

Mosher

[11] Patent Number: 4,823,996
[45] Date of Patent: Apr. 25, 1989

[54] ROOF-TOP ACCESSORY BAR, AND METHODS OF CONSTRUCTING AND UTILIZING SAME

[76] Inventor: Patrick W. Mosher, 24507 Haskell, Taylor, Mich. 48180

[21] Appl. No.: 77,385

[22] Filed: Jul. 24, 1987

[51] Int. Cl.⁴ .......................... B60N 11/00; B60Q 1/00
[52] U.S. Cl. ........................................ 224/322; 362/80
[58] Field of Search ................. 224/309–331, 224/277, 282; 362/80, 236

[56] References Cited

U.S. PATENT DOCUMENTS

| | | |
|---|---|---|
| 3,281,030 | 10/1966 | Gosswiller . |
| 3,375,365 | 3/1968 | Gross . |
| 3,542,264 | 11/1970 | Meyer et al. .................. 224/326 X |
| 3,677,451 | 7/1972 | Burland ............................. 224/322 |
| 3,721,374 | 3/1973 | Eby . |
| 3,779,436 | 12/1973 | Burland ............................. 224/317 |
| 4,087,124 | 5/1978 | Wiley, Jr. ..................... 224/309 X |
| 4,114,789 | 9/1978 | Blaylock et al. .................... 224/321 |
| 4,120,435 | 10/1978 | Eby . |
| 4,180,010 | 12/1979 | McDermott et al. .......... 224/321 X |
| 4,538,217 | 8/1985 | Ewing et al. . |
| 4,692,845 | 9/1987 | Widhalm et al. ..................... 362/80 |
| 4,733,809 | 3/1988 | Pursell ............................ 224/319 X |

FOREIGN PATENT DOCUMENTS 0074244  5/1982  Japan ................. 224/317

Primary Examiner—Henry J. Recla
Attorney, Agent, or Firm—Brooks & Kushman

[57] ABSTRACT

A roof-top accessory unit for vehicles having one or more safety devices, such as lights or sirens, fitted thereto. The bar is capable of movement to either a lowered or a raised position, to allow underpassage of the vehicle through places of restricted height such movement being made manually or electrically. According to the manual embodiment, the bar is locked into its raised position by releasable latches. According to the electric embodiment, the bar is locked into either its lowered or raised positions by an electric-solenoid operated locking mechanism.

10 Claims, 1 Drawing Sheet

U.S. Patent
Apr. 25, 1989
4,823,996
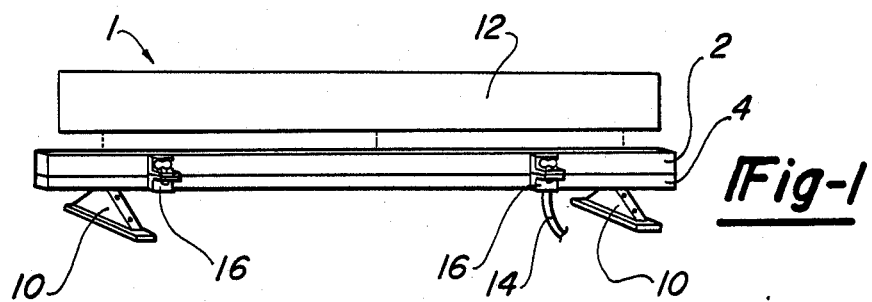
*Fig-1*
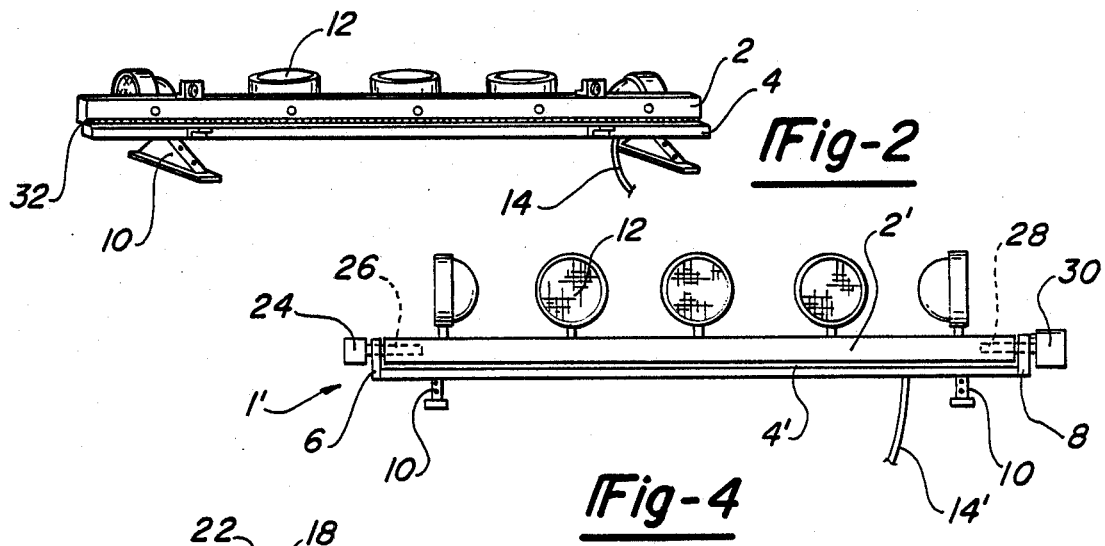
*Fig-2*
*Fig-4*
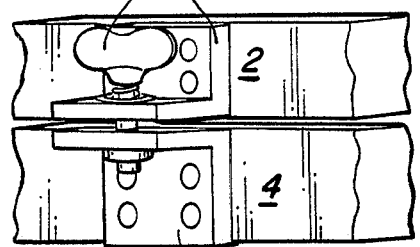
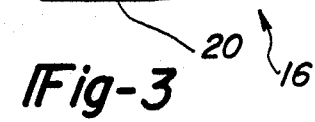
*Fig-3*

ROOF-TOP ACCESSORY BAR, AND METHODS OF CONSTRUCTING AND UTILIZING SAME

BACKGROUND OF THE INVENTION

1. Field of the Invention

The present invention relates to roof-top accessory bars for vehicles. More particularly, the invention relates to a roof-top accessory bar for attachment to the roof of an off-road vehicle which facilitates the hinged lowering and raising of lights or other accessories mounted on the accessory bar.

2. Description of the Relevant Art

The art is exemplified by: Gosswiller U.S. Pat. No. 3,281,030 entitled "VEHICLE ROOF CARRIER"; Gross U.S. Pat. No. 3,375,365 entitled "AUTOMOBILE LIGHT"; Eby U.S. Pat. No. 3,721,374 entitled "LAMP MOUNT FOR AUTOMOTIVE VEHICLES"; Eby U.S. Pat. No. 4,120,435 entitled "EMERGENCY LIGHT BAR"; and Ewing et al U.S. Pat. No. 4,538,217 entitled "FLOODLIGHT LUMINAIRE".

The present invention includes features which are not taught or suggested by the relevant art. These features provide an accessory bar which is manually or automatically moved into either a raised position or a lowered position.

SUMMARY OF THE INVENTION

The present invention provides an accessory bar for placement atop a vehicle's roof, particularly the roof of an off-road vehicle. The accessory bar is comprised of a lower portion attachable to a roof top and an upper portion hingedly attached to the lower portion. One or more lights or other accessories, including horns, sirens or alarms, are fitted to the top side of the upper portion. The upper portion of the bar may be manually lowered, or, in an alternate embodiment, may be lowered by means of a motor. In the latter embodiment, the upper portion is locked in either a raised or lowered position by means of a solenoid-operated locking mechanism.

An object of the present invention is to provide an accessory bar for a vehicle.

Another object of the invention is to provide such a device which is inexpensive to construct and maintain.

A further object of the invention is to provide such a device which can accommodate one or more lights.

Yet another object of the invention is to provide such a device which can accommodate one or more horns, sirens or alarms.

Yet another object of the invention is to provide such a device which is capable off being hingedly lowered thereby facilitating underpassage of the vehicle through places of restricted height.

A further object of the present invention is to provide such a device which may be manually lowered or raised and locked.

Still another object of the present invention is to provide such a device which may be electrically lowered or raised and locked.

Yet a further object of the present invention is to provide such a device which is fittable to a variety of vehicle roof sizes and shapes.

For the accomplishment of these and related objects which shall become apparent as the description proceeds, the present invention resides in the construction, combination and arrangement of parts as shall be hereinafter more fully described, illustrated in the accompanying drawings, and pointed out in the appended claims.

BRIEF DESCRIPTION OF THE DRAWINGS

FIG. 1 illustrates a perspective view of a first embodiment of an accessory bar in its raised position according to the present invention.

FIG. 2 illustrates a perspective view of the device of FIG. 1 in its lowered position.

FIG. 3 illustrates a detailed perspective view of a locking means of the first embodiment according to the present invention.

FIG. 4 illustrates a front view of a second embodiment of an accessory bar in its raised position according to the present invention.

DETAILED DESCRIPTION OF THE PRESENT EMBODIMENTS

With reference to FIGS. 1-4 there are described two embodiments of the preferred apparatus and selected elements thereof.

FIGS. 1, 2 and 3 relate to a first embodiment of the accessory bar.

FIG. 4 relates to a second embodiment of the accessory bar.

With reference now to FIGS. 1 and 2, there is shown a first embodiment of the apparatus, a manually operated, lowerable accessory bar. FIG. 1 illustrates the bar in its raised position, while FIG. 2 illustrates the bar in its lowered position.

The bar of the first embodiment is generally indicated as 1 in FIG. 1. There is shown an upper elongate portion 2 and a lower elongate portion 4. Preferably, but not exclusively, fitted along the top side of upper portion 2 are safety devices 12, such as lights, although it is envisioned that a single lamp may be used, or one or more horns, sirens or alarms may be provided in lieu of or in addition to lights 12.

Lower elongate portion 4 is not directly fitted to a vehicle's roof-top, but is instead braced thereto by vertical supports. As illustrated, there are preferably provided a pair of vertical support braces 10 fitted between the bottom side of lower portion 4 and a vehicle's rooftop (not shown).

Upper portion 2 is held in its upright position (as illustrated in FIG. 1) relative to lower portion 4 by means of a locking device. This device is generally indicated by 16, and will be discussed in detail below.

To provide power to lights 12 (or horns, sirens, etc.) fixed atop upper portion 2, conventional electric conduit 14 is provided (shown here in part) and extends to an appropriate connection point in the vehicle's circuitry.

With reference now to FIG. 2, there is shown the embodiment of FIG. 1 in its lowered position. With upper portion 2 and its associated lights 12 in this position, elongate hinge 32 is readily visible fitted between upper portion 2 and lower portion 4. Hinge 32 allows for the free, unrestricted lowering and raising of upper portion 2 and its associated members relative to lower portion 4 to allow underpassage of the vehicle through places of restricted height.

As generally indicated above, upper portion 2 is held in the upright position relative to lower portion 4 by means of a locking device 16. With reference therefore now to FIG. 3, a detailed view of the elements of locking device 16 and its relation to upper portion 2 and lower portion 4, both shown in part, is illustrated. Locking device 16 preferably, but not exclusively, is comprised of a top extension member 18 fitted to upper portion 2 and a bottom extension member 20 fitted to lower portion 4. While any conventional means may be practically used for locking the extension members 18 and 20 together, there is preferably illustrated a commonly available fitting 22 of the type sold by Camloc Fasteners (trademark) (2600 series winged protruding fastener and 212-12 receptacle).

With reference now to FIG. 4, there is shown a second embodiment of the device, an electrically operated, lowerable accessory bar, illustrated in its raised position. Like its manual counterpart of the first embodiment, the device illustrated in FIG. 4 is capable of being moved and locked to either the raised or lowered positions, although according to the present embodiment this is accomplished electrically.

The accessory bar of the second embodiment is generally indicated as 1' in FIG. 4. There is shown an upper elongate portion 2' and a lower elongate portion 4'. Preferably, but not exclusively, fitted along the top side of upper portion 2' are lamps 12, although, like the first embodiment, it is envisioned that a single lamp may be used, or one or more horns, sirens or alarms may be provided in lieu of or in addition to lights 12.

Lower elongate portion 4' is fitted preferably, but not exclusively, with a pair of vertical upright braces 10 fitted between the bottom side of lower portion 4' and a vehicle's roof-top (not shown).

Preferably, lower portion 4' is provided at each of its ends with upright supports 6, 8. Supports 6, 8 are fixed to portion 4'. Both supports are provided with apertures which allow therethrough the respective passage of rotatable shafts 26, 28. Shafts 26, 28 are fixed at each end of upper elongate portion 2', and rotatably traverse members 6, 8.

Motor 30 is preferably, but not exclusively, fixed to the free end of shaft 28 and is fixedly supported by upright member 8.

To lock upper portion 2' in either of its raised or lowered positions, a solenoid-operated locking mechanism 24 is provided, although it is envisioned that other locking mechanisms may be effectively provided. Solenoid-operated locking mechanism 24 is fixed to the free end of shaft 26 and is fixedly supported by upright member 6.

Preferably, but not exclusively, both locking mechanism 24 and motor 30 are remotely operated within the vehicle by conventional means (not shown). Power is delivered to locking mechanism 24, motor 30 and lights 12 (or other accessories) by way of conventional electric conduit 14' illustrated in part.

In use, the manual device according to the first embodiment is selectively raised or lowered and is locked into place by means of the locking device 16 fully described hereinabove. The automatic device according to the second embodiment is operated from within the vehicle, thereby allowing the selective lowering, raising and locking of upper portion 2' with respect to lower portion 4' at the will of the operator.

While the present invention has been illustrated and described in connection with preferred embodiments, it is not to be limited to the particular structure shown, because many variations thereof will be evident to one skilled in the art and are intended to be encompassed in the present invention as set forth in the following claims.

I claim:

1. A selectively lowerable and raisable vehicle accessory bar comprising:
   a first elongate fixed bar having a top side and a bottom side;
   a second elongate movable bar having a top side and a bottom side;
   a hinge connected to and extending along both the top side of the first elongate fixed bar and the bottom side of the second elongate movable bar, so that the second elongate movable bar may be moved arcuately parallel to its length with respect to the first elongate fixed bar said hinge connected to said first bar and said second bar allows said first bar and said second bar to be reversibly moved relative to one another from a raised position whereby said top side of said first bar and said bottom side of said second bar substantially overlap to a lowered position whereby said top side of said first bar and said bottom side of said second bar do not overlap to allow underpassage of the vehicle through plases of restricted height;
   at least two foot members fitte to the bottom side of said first elongate fixed bar adjacent opposite ends thereof and adapted for mounting said first bar on a vehicle roof;
   at least one safety device disposed upon said top side of said second elongate fixed bar; and
   means for selectively holding said bars in said overlapped position.

2. A selectively lowerable and raisable vehicle accessory bar according to claim 1, wherein:
   said locking means comprises one or more latches each having a male locking portion and a female receiving portion.

3. A selectively lowerable and raisable vehicle accessory bar comprising:
   a first elongate fixed bar substantially spanning the width of a vehicle's roof-top;
   said first elongate fixed bar having a top side and a bottom side;
   a second elongate movable bar substantially spanning the width of a vehicle's roof-top;
   said second movable bar having a top side and a bottom side;
   a hinge connected to and extending along both the top side of the first elongate fixed bar and the bottom side of the second elongate movable bar, so that the second elongate movable bar may be Moved arcuately parallel to its length with respect to the first elongate fixed bar said hinge connected to said first bar and said second bar allows said first bar and said second bar to be reversibly moved relative to one another from a raised position whereby said top side of said first bar and said bottom side of said second bar substantially overlap to a lowered position whereby said top side of said first bar and said bottom side of said second bar do not overlap to allow underpassage of the vehicle through places of restricted height;
   said top side of said second movable bar having at least one safety device fitted thereto;
   at least two foot portions disposed on the bottom side of said first fixed bar adjacent opposite ends thereof and including means for supporting said first bar on the roof-top of a vehicle; and
   means for selectively holding said bars in said overlapped position.

4. A selectively lowerable and raisable vehicle accessory bar according to claim 2, wherein:
said locking means comprises one or more releasably lockable latches.

5. A selectively lowerable and raisable vehicle accessory bar according to claim 1, wherein said at least one safety device is selected from a group consisting of lights, sirens, horns, and alarms.

6. A selectively lowerable and raisable vehicle accessory bar according to claim 1, wherein each safety device is interchangeable with any other of the safety devices.

7. A selectively lowerable and raisable vehicle accessory bar according to claim 1, wherein said said at least one safety device comprises one or more lights.

8. A selectively lowerable and raisable vehicle accessory bar according to claim 1, wherein said said at least one safety device comprise one or more sirens.

9. A selectively lowerable and raisable vehicle accessory bar according to claim 1, wherein said said at least one safety device comprise one or more horns.

10. A selectively lowerable and raisable vehicle accessory bar according to claim 1, wherein said said at least one safety device comprise one or more alarms.

* * * * *